United States Patent Office 3,287,578
Patented Nov. 22, 1966

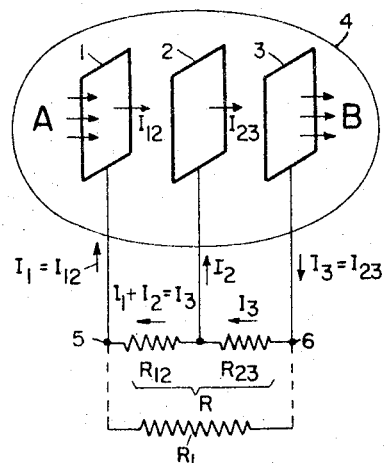
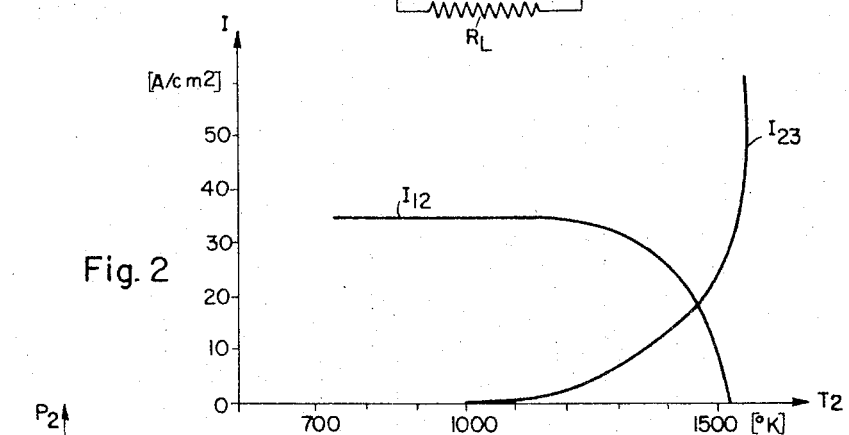
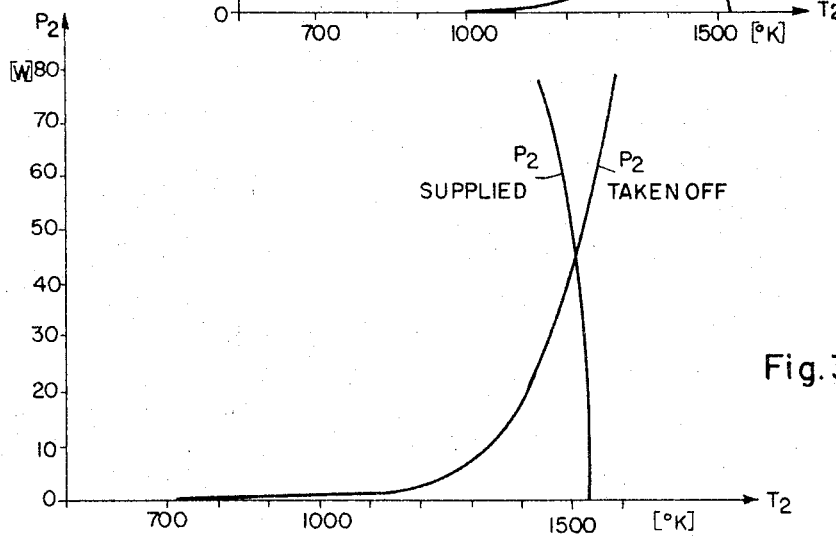

3,287,578
THERMIONIC ENERGY CONVERTER
Werner Oldekop, Erlangen, and Erika Eberth, Forchheim, Germany, assignors to Siemens-Schuckertwerke Aktiengesellschaft, Berlin-Siemensstadt, Germany, and Erlangen, Germany, a corporation of Germany
Filed Dec. 28, 1960, Ser. No. 79,076
The portion of the term of the patent subsequent to June 18, 1983, has been disclaimed
9 Claims. (Cl. 310—4)

Our invention relates to a thermionic energy converter for direct conversion of heat into electrical energy.

The known thermionic converters are essentially diodes, comprising two electrodes of suitable materials within a discharge space evacuated or filled with plasma, one of the electrodes being heated and the other kept cool. The electrons issuing from the hot electrode (cathode or emitter) pass to the cooled electrode (anode or collector) and thus provide an electric current in an external load circuit which connects the two electrodes with each other. The attainable efficiency of such converters is limited, principally due to heat radiation losses of the hot emitter.

It is an object of our invention to improve the efficiency of such thermionic converters.

To this end, and in accordance with our invention, we interpose between the emitter and collector a third electrode which subdivides the converter into two half cells electrically connected in series. According to another, more specific feature, two resistors are connected in parallel with the respective two half cells, the resistors having the resistance rating required to make the voltage drop of each resistor equal to the difference in the respective work functions of the two electrodes between which the resistor is connected.

The foregoing and more specific features of our invention will be apparent from the following description taken in conjunction with the accompanying drawings in which:

FIG. 1 illustrates schematically a thermionic converter according to the invention;

FIG. 2 is a graph for determining the currents flowing between the electrodes in dependence upon the temperature of the intermediate electrode;

FIG. 3 is a graph for determining the temperature of the intermediate electrode.

Figure 4:
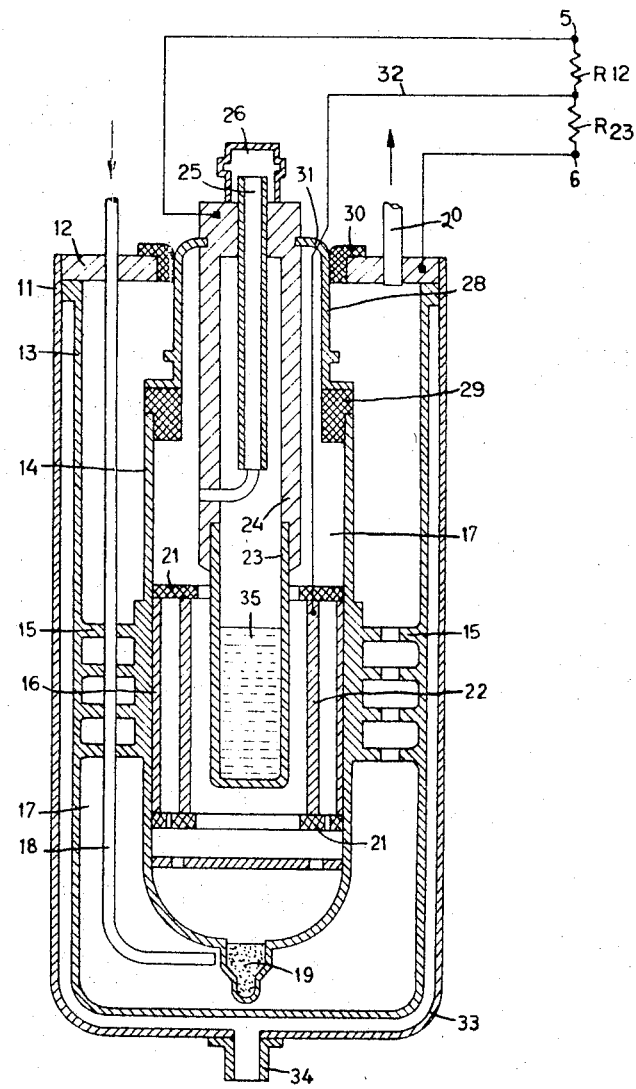
FIG. 4 shows in cross section an example of a thermionic converter in accordance with the invention.

As shown in FIG. 1, a vessel 4 is evacuated, or is filled with a readily ionizable gas, for example cesium vapor, at negative pressure. Mounted in the vessel is an emitter electrode 1 in spaced relation to a collector electrode 3, both in accordance with the known thermionic converters. Disposed between emitter and collector electrodes is a third, i.e., middle, electrode 2 which subdivides the converter into two half cells and acts as a reflector for heat radiation from the emitter 1, and thus serves to shield the collector 3 from the heat radiation issuing from the emitter 1. Heat is supplied to the emitter at A. Heat is dissipated from the collector 3 at B. The temperature of the third electrode 2 adjusts itself in dependence upon the current load and the respective temperatures of the hot emitter and the cold collector, the latter two temperatures being kept constant during normal operation. Generally, the converter may be looked upon as constituting a series connection of two voltage sources.

The voltages and currents generated in the converter are determined by the work functions of the three electrodes respectively, these work functions being properties of the electrode materials. It is particularly advantageous to so select the work function and hence the material of the intermediate electrode 2 that, on the one hand, the flow of current from the intermediate electrode to the heated emitter 1 is as small as feasible and that, on the other hand, the voltages do not become too low.

Assume, for the purpose of exemplification, that the load to be energized from the converter consist of a heater winding whose ohmic resistance R is composed of two component resistances $R_{12}$ and $R_{23}$. The converter operates under optimum efficiency when $$U_{12} = R_{12} \cdot I_1 = (a_1 - a_2)/e_0$$
$$U_{23} = R_{23} \cdot I_3 = (a_2 - a_3)/e_0$$

and $$U = U_{12} + U_{23} = (a_1 - a_3)/e_0$$

In these equations $a_1$ denotes the work function of the hot emitter, $a_2$ the work function of the intermediate electrode 2, $a_3$ the work function of the cold collector 3, and $e_0$ the elementary charge. The conditions expressed by the equations, according to which the voltage occurring between each two sequential electrodes is proportional to the difference between the respective work functions of the electrodes, can always be satisfied if the temperature difference $T_1 - T_3$ (these being the temperatures of the emitter and collector respectively) is sufficiently large and hence the electromotive force E.M.F (U at $R_{12} = R_{23} = \infty$) becomes greater than $(a_1 - a_3)/e_0$. In first approximation, the E.M.F. value is proportional to the temperature difference as in any thermocouple. Consequently, with the aid of the resistors $R_{12}$, $R_{23}$ the working point of the intermediate electrode can be predetermined. The most favorable efficiency of the converter is obtained when the voltage at each of the component two resistors is equal to the difference between the work functions of the two electrodes to which each resistor is connected.

These optimum resistance values can be determined empirically as follows:

The temperature difference $T_1 - T_3$ is made so large that under no-load conditions of the converter the voltage U at the converter terminals is equal to $$U = U_{12} + U_{23} = (a_1 - a_3)/e_0$$

Then, arbitrary values are inserted for $R_{12}$ and $R_{23}$. As a result, the term $U = U_{12} + U_{23}$ will always become smaller than the no-load voltage of the converter. Consequently, if, for example, $R_{12}$ is made equal to $R_{23}$ and the term $R = R_{12} + R_{23}$ is so chosen that $$U_{12} + U_{23} = (a_1 - a_3)/e_0$$

then the voltage $U_{12}$ will satisfy one or the other of the following alternative conditions:

$$U_{12} > (a_1 - a_2)/e_0$$

or $$U_{12} < (a_1 - a_2)/e_0$$

In the first case, the value of $R_{12}$ must be made smaller. In the second case, it must be made larger. Simultaneously, the value of $R_{23}$ must be changed so that $$U = U_{12} + U_{23}$$

always remains equal to $(a_1 - a_3)/e_0$, until ultimately $U_{12} = (a_1 - a_2)/e_0$; $U_{23} = (a_2 - a_3)/e_0$ and $U = (a_1 - a_3)/e_0$.

However it is preferable to determine the resistance values for $R_{12}$ and $R_{23}$ by calculation, at least in approximation. These two resistance values, as a rule, also serve as the load in the external electric circuit of the converter. However, if desired, they may be used only for determining the working point of the intermediate electrode, while the load $R_L$ proper is connected parallel to the two auxiliary resistors across the terminals 5 and 6 of the converter.

The following example of computation is based upon these values:

Hot emitter: $T_1=2200°$ K.; $a_1=3$ e.v.
Intermediate electrode: $a_2=2$ e.v.
Cold collector: $T_3=700°$ K.; $a_3=1.5$ e.v.

For calculating the resistances on this basis, it is first necessary to determine the electric currents. They result from the equation $$I_{hk}=A\left(T_h^2 \cdot e^{-\frac{a_h}{kT_h}} - T_k^2 \cdot e^{-\frac{a_k}{kT_k}}\right)$$

wherein A is the thermal emission constant $A=60$ a./cm.$^2 \cdot °$K.$^2$, $a_h$ and $a_k$ are the work function of the emitter and collector respectively, and $k=0.863 \cdot 10^{-4}$ e.v./° K. is the Boltzmann constant.

The current curves versus the temperature $T_2$ of the intermediate electrode are apparent from the diagram in FIG. 2 in which the abscissa denotes the temperature $T_2$ in degree Kelvin, and the ordinate indicates the current flowing between each two of the electrodes, in amp per cm.$^2$. The temperature $T_2$ at the intermediate electrode 2 which adjusts itself under the conditions of the above-mentioned example, follows from the requirement that the power supplied to the intermediate electrode ($q_{2s}$) must be equal to the dissipated power ($q_{2d}$):

$$q_{2s}=q_{2d}$$

These amounts of power are indicated in FIG. 3 versus the temperature $T_2$. The abscissa in FIG. 3 denotes temperature in degree Kelvin, and the ordinate denotes the supplied or dissipated power in watts. The intermediate electrode therefore assumes a temperature of 1500° K. It follows from FIG. 2 that the currents will assume the following values:

$$I_{12}=9.7 \text{ a./cm.}^2$$

and $$I_{23}=25.6 \text{ a./cm.}^2$$

In a practical embodiment of a converter according to the invention, the area of each electrode may amount to $f=100$ cm.$^2$, the voltage $U_{12}=(a_1-a_2)/e_0=1$ v., and the voltage $U_{23}=(a_2-a_3)/e_0=0.5$ v. On the basis of these magnitudes, it follows that $$I_{12}=I_1=9.7 \cdot f \text{ a./cm.}^2=970 \text{ a.}$$
$$I_{23}=I_3=25.6 \cdot f \text{ a./cm.}^2=2560 \text{ a.}$$
$$I_2=I_3-I_1=1590 \text{ a.}$$

This results in:

$$R_{23}=\frac{U_{23}}{I_3}=\frac{0.5 \text{ v.}}{2560 \text{ a.}}=1.95 \cdot 10^{-4} \text{ ohm}$$

$$R_{12}=\frac{U_{23}}{I_1}=\frac{1 \text{ v.}}{970 \text{ a.}}=1.03 \cdot 10^{-3} \text{ ohm}$$

For other temperatures $T_1$ and $T_3$, other work functions or other electrode areas, correspondingly different values will be obtained. The optimum resistance values must then be calculated analogously.

The electric power, with the voltages determined by the above-mentioned resistors, amounts to 25.5 watt/cm.$^2$.

The overall efficiency of the converter, corresponding to the quotient of electrical energy generated and heat energy supplied to the emitter, amounts to 43%. The same converter but without the intermediate electrode would afford a maximum efficiency of 35%.

The above-described thermionic energy converter according to the invention is particularly advantageous in conjunction with a nuclear reactor furnishing the heat for the emitter from fission of the nuclear fuel. An embodiment of such a converter will be described with reference to FIG. 4.

The converter comprises a housing 11 vacuum-tightly sealed by means of a cover 12 which is preferably joined with the housing 11 by welding. The housing 11 and the cover 12 may be made of steel. Fastened to the cover 12 is a cylindrical container 13 which is connected through cooling webs 15 with another cylindrical container 14, serving as collector. The inner container 14 may likewise be made of steel and is provided with a coating 16 of barium or other material having a relatively low work function. The annular interspace 17 between the two containers 13, 14 is filled with coolant, for example oil, which is supplied through a pipe 18, so as to impinge upon a downwardly bulging portion 19 in the bottom of the inner container 14, the bottom portion 19 being filled with cesium. The oil leaves through pipe 20. A cylindrical middle electrode 22 of a material having a low work function is mounted concentrically within the inner container 14 by means of insulating rings 21 consisting preferably of ceramic material. A centrally located hollow cylinder 23 closed at the bottom protrudes downwardly into the electrode 22 and serves as the emitter of the converter. The cylindrical emitter 23 is fastened to a tubular carrier 24 in coaxial alignment therewith. The emitter cylinder 23 consists of molybdenum or other material of relatively high work function. Mounted within the tubular carrier 24 is a pipe 25 which is closed at the top by means of a stopper 26 and communicates with the interspace 17a to permit evacuating this space. The interspace 17a is upwardly closed by a bell-shaped member 28 which is connected with the inner container 14 by an electrically insulating ring 29 and is insulated from the cover 12 by another insulating ring 30. The emitter potential can be taken off at part 24 or 28. The collector potential is available at the cover 12, and the potential of the intermediate electrode 22 is available at a conductor 32 which passes through an insulating seal 31 of the bell 28. The annular interspace 33 between the container 13 and the wall of vessel 11 communicates with a conduit 34 to which a vacuum pump can be connected.

Before inserting the thermionic converter into the core of a nuclear reactor, the hollow cylindrical emitter 23 is filled with fissionable material 35. The heat resulting from nuclear fission causes heating of the emitter. When the converter is thus used as an insert in the core of a nuclear reactor, the outer vessel 11 can be omitted.

Examples of materials having a low work function, suitable for the emitter and the intermediate electrode, are barium, barium-impregnated tungsten, a coating of barium oxide and strontium oxide (BaO/SrO) upon nickel, a cesium coating on silver oxide (AgO) or thorium oxide (ThO$_2$) and, preferably, lanthanum boride (LaB$_6$). Suitable as materials of relatively high work function are tungsten, tantalum, molybdenum, platinum, a coating of thorium on tungsten, copper, iron, nickel.

It will be obvious to those skilled in the art, upon studying this disclosure, that thermionic converters according to our invention can be modified in various ways with respect to design and materials and hence may be given embodiments other than particularly illustrated and described herein, without departing from the essential features of our invention and within the scope of the claims annexed hereto.

We claim:
1. A thermionic energy converter comprising a vacuum vessel containing plasma, an emitter electrode and a collector electrode spaced from each other in said vessel, heating means for said emitter electrode, cooling means for said collector electrode, electrode means for reflecting heat radiation from said emitter electrode and for shielding said collector electrode from the heat radiation issuing from said emitter electrode, said electrode means including a third electrode located intermediate said emitter electrode and said collector electrode and dividing the vacuum space between them into two series-connected cell portions, one of said cell portions comprising the emitter electrode and said third electrode, the other of said cell portions comprising said third electrode and said collector electrode, and a pair of resistors, circuit means connecting said resistors across said cell portions so that said resistors have respective voltage drops substantially proportional to the work functions of the electrodes to which said resistors are connected, one of said resistors being connected to said emitter electrode and to said third electrode, the other of said resistors being connected to said collector electrode and to said third electrode.

2. The apparatus defined in claim 1, said third electrode being sufficiently imperforate to be impermeable to space flow of electrons through said third electrode.

3. A thermionic energy converter according to claim 1, said emitter electrode forming a hollow body, said third electrode and said collector electrode surrounding said body, said heating means being located in the interior of said body and comprising nuclear fuel substance located in the interior of said body.

4. A thermionic energy converter according to claim 1, said emitter electrode forming a hollow body, said third electrode and said collector electrode surrounding said body, said heating means being located in the interior of said body and comprising nuclear fuel substance located in the interior of said body, the emitter electrode and third electrode comprising a material having a lower work function than the collector electrode.

5. A thermionic energy converter according to claim 1, said emitter electrode forming a hollow body, said third electrode and said collector electrode surrounding said body, said heating means comprising nuclear fuel substance located in the interior of said body, said emitter electrode and said third electrode comprising a material having a lower work function than said collector electrode, the lower work function material being taken from the class consisting of barium, barium-impregnated tungsten, a coating of barium oxide-strontium oxide upon nickel, a cesium coating on silver oxide, a cesium coating on thorium oxide, and lanthanum boride; the material of said collector electrode, of high work function, being taken from the class consisting of tungsten, tantalum, molybdenum, platinum, a coating of thorium on tungsten, copper, iron and nickel.

6. A thermionic energy converter comprising a vacuum vessel containing plasma, an emitter electrode and a collector electrode spaced from each other in said vessel, heating means for said emitter electrode, cooling means for said collector electrode, electrode means for reflecting heat radiation from said emitter electrode and for shielding said collector electrode from the heat radiation issuing from said emitter electrode, said electrode means including a third electrode located intermediate said emitter electrode and said collector electrode and dividing the vacuum space between them into two series-connected cell portions, one of said cell portions comprising the emitter electrode and said third electrode, the other of said cell portions comprising said third electrode and said collector electrode, and a pair of resistors, circuit means connecting said resistors across said cell portions so that said resistors have respective voltage drops substantially proportional to the work functions of the electrodes to which said resistors are connected, one of said resistors being connected to said emitter electrode and to said third electrode, the other of said resistors being connected to said collector electrode and to said third electrode, said third electrode having when in operation a temperature between those of said emitter electrode and said collector electrode.

7. The apparatus defined in claim 6, said third electrode being sufficiently imperforate to be impermeable to space flow of electrons through said third electrode.

8. A thermionic energy converter comprising a vacuum vessel containing plasma, an emitter electrode and a collector electrode spaced from each other in said vessel, heating means for said emitter electrode, cooling means for said collector electrode, electrode means for reflecting heat radiation from said emitter electrode and for shielding said collector electrode from the heat radiation issuing from said emitter electrode, said electrode means including a third electrode located intermediate said emitter electrode and said collector electrode and dividing the vacuum space between them into two series-connected cell portions, one of said cell portions comprising the emitter electrode and said third electrode, the other of said cell portions comprising said third electrode and said collector electrode, and a pair of resistors, circuit means connecting said resistors across said cell portions so that said resistors have respective voltage drops substantially proportional to the work functions of the electrodes to which said resistors are connected, one of said resistors being connected to said emitter electrode and to said third electrode, the other of said resistors being connected to said collector electrode and to said third electrode, said circuit means including three circuit leads connected to said emitter electrode, said collector electrode and said third electrode and extending to the outside of said vessel.

9. The apparatus defined in claim 8, said third electrode being sufficiently imperforate to be impermeable to space flow of electrons through said third electrode.

References Cited by the Examiner

UNITED STATES PATENTS

| 2,881,384 | 4/1959 | Durant | 322—2 |
| 3,079,515 | 2/1963 | Saldi | 310—4 |

FOREIGN PATENTS

| 797,872 | 7/1958 | Great Britain. |

MILTON O. HIRSHFIELD, *Primary Examiner.*

ORIS L. RADER, *Examiner.*